(12) United States Patent
Webb (10) Patent No.: US 6,766,116 B2
(45) Date of Patent: Jul. 20, 2004

(54) OPTICAL TRANSMISSION SYSTEM (75) Inventor: Steven Michael Webb, Kent (GB)

(73) Assignee: Alcatel, Paris (FR)

(*) Notice: Subject to any disclaimer, the term of this patent is extended or adjusted under 35 U.S.C. 154(b) by 483 days.

(21) Appl. No.: 09/757,567

(22) Filed: Jan. 11, 2001

(65) Prior Publication Data
US 2002/0075546 A1 Jun. 20, 2002

(30) Foreign Application Priority Data
Jan. 12, 2000 (GB) .............................. 0000657

(51) Int. Cl.$^7$ .............................. H04B 10/04
(52) U.S. Cl. ............. 398/196; 398/95; 398/195
(58) Field of Search ............... 395/95, 104–105, 395/118, 182, 183, 186, 195–196; 398/94, 84, 197, 87, 201, 85; 372/31–32

(56) References Cited

U.S. PATENT DOCUMENTS 5,880,870 A * 3/1999 Sieben et al. ............... 398/183
6,088,147 A * 7/2000 Weber et al. ............... 359/237
2003/0058509 A1 * 3/2003 Webb et al. ................ 359/187

FOREIGN PATENT DOCUMENTS

| EP | 0 466 182 A2 | 1/1992 |
| EP | 0 877 495 A2 | 11/1998 |
| WO | WO 96/37042 | 11/1996 |

* cited by examiner

Primary Examiner—Kinfe-Michael Negash
(74) Attorney, Agent, or Firm—Sughrue Mion, PLLC (57) ABSTRACT An optical transmission system for an optical communications system that has an optical source, an optical modulator for modulating an optical output of the optical source, and an optical filter arranged to substantially remove one of the upper and lower sidebands of the modulated optical output of the optical source. The optical transmission system further includes a control means to control at least one of the optical source and the optical filter to ensure that substantially only half of the power of the modulated optical output of the optical source is transmitted by the filter, thereby reducing the bandwidth of the optical signals transmitted by the system.

20 Claims, 6 Drawing Sheets

OPTICAL TRANSMISSION SYSTEM

FIELD OF THE INVENTION

The present invention relates to an optical transmission system and in particular to an optical transmission system for use in an optical communications system such as a submarine optical communications system or a terrestrial optical communications system.

BACKGROUND TO THE INVENTION

In submarine optical communications systems there is an increasing demand for transmission capacity due for example, to the ever increasing use of the internet around the world. This can be achieved by increasing the bandwidth of the communications system or by increasing the information content transmitted within the existing system bandwidth. In Dense Wavelength Dependent Multiplexed communications systems (DWDM) having a plurality of transmission channels, channel spacings are approaching the spectral linewidths of individual channels and so in such systems it is not possible simply to increase the volume of information transmitted as there are no available free wavelengths. This problem is exacerbated by the use of return-to-zero (RZ) format for the information transmission and the phase modulation techniques that are widely used which give rise to a relatively broad channel spectrum.

One proposed method of addressing this problem is to use the L-band of the optical frequency spectrum ie transmit information at wavelengths between 1570 nm and 1610 nm. However, this would require the redesigning of optical amplifiers and the consequential replacement of components in existing systems since these were not originally designed for operation in the L-band. This would be expensive and would lead to inevitable disruption of traffic whilst the system was being upgraded.

SUMMARY OF THE INVENTION

According to a first aspect of the present invention, an optical transmission system for an optical communications system, comprises: an optical source; an optical modulator for modulating an optical output of the optical source; an optical filter arranged to substantially remove one of the upper and lower sidebands of the modulated optical output of the optical source; and, control means to control at least one of the optical source and the optical filter to ensure that substantially only half of the power of the modulated optical output of the optical source is transmitted, thereby reducing the bandwidth of the optical signals transmitted by the system.

The present invention provides an optical transmission system arranged to provide an optical signal having had either its upper or lower sideband removed by an optical filter. By removing one of the sidebands, the bandwidth of the signal and therefore the required wavelength separation of individual wavelength channels can be substantially reduced so that the number of channels can be increased and/or the power of each channel can be increased.

Preferably, a vestige of either the upper or lower sideband is also transmitted.

Since the wavelength spectrum of the modulated output of the optical source is symmetrical about the carrier wavelength, the information content in the spectrum is duplicated.

Therefore, when one half of the signal is removed, leaving only a single sideband and a vestige of the removed sideband, very little information is lost.

Preferably, the control means is arranged to move the wavelength spectrum of the modulated optical output of the optical source and a transmission profile of the optical filter relative to each other to control the power of the transmitted signal.

More preferably, the control means comprises a feedback loop arranged to detect reflected light from the optical filter and transmitted light from the optical filter and to move the wavelength spectrum of the modulated optical output of the optical source and the transmission profile of the optical filter relative to each other to ensure the detected power of the transmitted light and the detected power of the reflected light remain substantially equal. The use of a feedback loop enables the control of the power of the transmitted and reflected light in the system to be effected automatically.

Preferably, the feedback loop comprises a first branch having an optical sensor arranged to detect the intensity of the reflected light from the optical filter and a second branch having an optical sensor arranged to detect the intensity of the transmitted light from the optical filter. Preferably the feedback loop comprises control means arranged to receive outputs from optical sensors in the first and second branches of the feedback loop, respectively, and vary the wavelength of the laser source and/or the position of the rising edge of the transmission profile of the optical filter accordingly.

Preferably, the optical modulator is a data driven optical modulator such as a Mach Zehnder modulator, for example.

Preferably, the optical filter is an optical fibre grating. Preferably, the optical filter comprises an optical fibre grating having a notch transmission profile, wherein a carrier frequency of the modulated optical output is controlled to substantially coincide with the rising edge of the notch transmission profile, thereby ensuring that substantially half of the modulated optical output of the optical source is transmitted and half is rejected.

In one example, the control unit is arranged to control the temperature of the optical fibre grating, thereby controlling the position of the rising edge of the transmission profile relative to the wavelength spectrum of the modulated optical output of the optical source.

Preferably, a first optical coupler, for example an optical circulator, is included in the transmission system arranged to couple the modulated optical output of the optical source from a transmission path in the transmission system to the optical filter positioned in the first branch of the feedback loop, and couple reflected light from the optical filter back to the transmission path in the transmission system.

More preferably, a second optical coupler is provided arranged to couple light from the first optical coupler to the optical sensor positioned in the second branch of the feedback loop.

According to a second aspect of the present invention, a line terminal endstation for a wavelength division multiplexed communications system, comprises a number of optical transmission systems for generating a number of individual channels, in which at least one of the optical transmission systems is an optical transmission system according to the first aspect of the present invention.

According to a third aspect of the present invention, an optical communications system comprises at least one line terminal endstation according to the second aspect of the present invention.

Preferably, the communications system is a submarine communications system. Preferably the communications system is a terrestrial communications system.

BRIEF DESCRIPTION OF THE DRAWINGS

Examples of the present invention will now be described in detail with reference to the accompanying drawings, in which.

DETAILED DESCRIPTION

Figure 1:
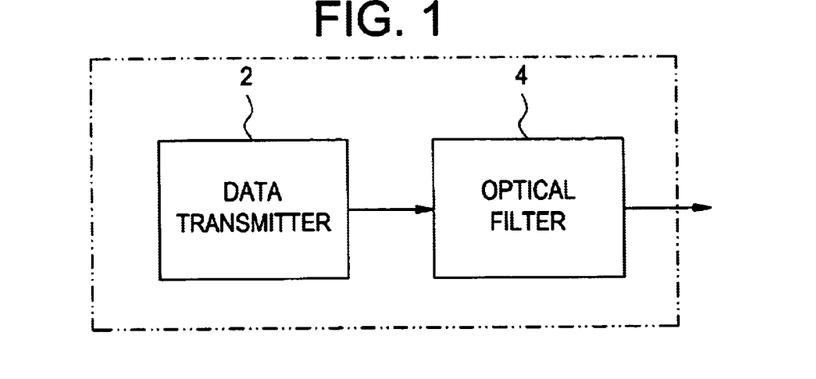
FIG. 1 shows a block diagram of an optical transmission system according to the present invention.

FIG. 1 shows a block diagram of an optical transmission system according to the present invention. The system has a data transmitter 2 and a vestigial sideband (VSB) optical filter 4. As will be described below, the VSB filter 4 is arranged to receive an optical spectrum representative of data to be transmitted from the data transmitter 2 and provide a VSB modulated optical output to the communications system. The VSB filter 4 is arranged to ensure that substantially half the power of the original wavelength spectrum provided by the transmitter 2 is actually transmitted onto the communications system. As will be explained below, this has the effect of approximately halving the required bandwidth for each transmitted channel thereby allowing additional channels to be transmitted within the existing system bandwidth.

Figure 2:
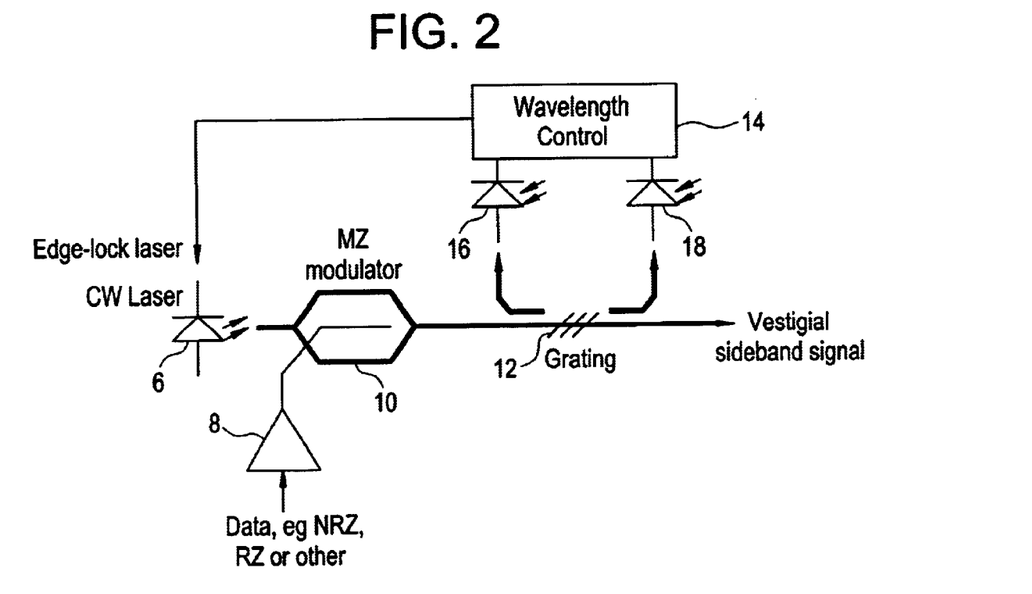
FIG. 2 shows a more detailed block diagram of an example of an optical transmission system according to the present invention.

FIG. 2 shows a more detailed block diagram of an example of an optical transmission system of the type shown in FIG. 1. In this example, the transmission system has a continuous wave (CW) laser source 6 and a data source 8 coupled to an optical modulator 10. Alternatively, the laser source could be modulated directly. The modulator 10 may be a Mach Zehnder modulator or any other suitable type of optical modulator. An output from the modulator 10 is coupled to an optical filter 12 arranged to transmit part of the modulator output and reflect the remainder. The transmitted and reflected portions are coupled to a wavelength control unit 14 via pin diodes 16 and 18 respectively. The control unit 14 serves to compare the power of the received signals and, in this case, control the output wavelength of the CW laser source 6 in dependence on this. As will be explained below with reference to FIG. 3, the wavelength of the CW laser source is controlled to ensure that the power of the reflected and transmitted signals received by pin diodes 16 and 18 respectively, are substantially equal.

Figure 3:
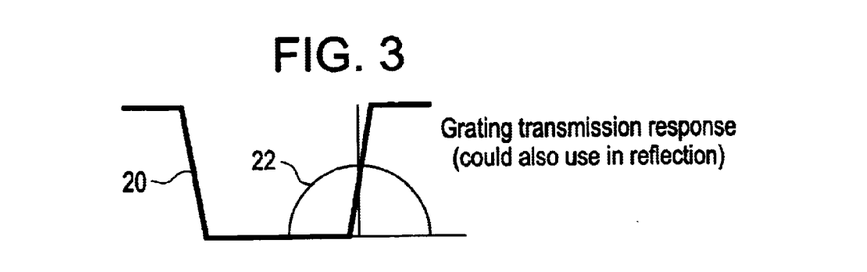
FIG. 3 is a graph showing the grating transmission response with respect to wavelength of an optical filter used in the optical transmission system of FIG. 2.

FIG. 3 shows a graph showing the grating transmission profile 20 of the optical filter 12 and a typical optical wavelength spectrum 22 of the modulator 10 used in the optical transmission system according to the present invention. In this example, the optical filter 12 is a notch filter arranged so that the rising edge of the transmission profile of the filter is at the same wavelength as the centre of the modulator wavelength spectrum 22. The wavelength at this point is effectively a cut-off wavelength for the optical spectrum so that wavelengths above this value are transmitted whereas wavelengths below this value are not. This relationship between the wavelength spectrum of the optical modulator and the transmission profile of the optical filter will ensure that substantially half the optical spectrum will be transmitted (the half having wavelengths greater than the cut-off wavelength) whereas half the optical spectrum will be reflected (the half having wavelengths less than the cut-off wavelength).

Since the optical spectrum provided by the modulator 10 is symmetrical about the carrier wavelength 24, the information content in the wavelength spectrum is duplicated. Therefore, when one half of the signal is removed, leaving only a single sideband and a vestige of the removed sideband, very little information is lost. Furthermore, there is net transmission gain due to the decreased power loading on the communications system. Thus, more channels may be transmitted on the system without adjusting the system parameters. Alternatively, the communications system length could be increased.

As can be seen from FIG. 3, the transmission profile is not quite a square notch. Accordingly, a proportion of the signal immediately below the carrier wavelength 24 is transmitted and a proportion of the signal immediately above the carrier wavelength 24 is 8 reflected. The feedback control loop implemented by the control unit 14 is arranged to ensure that these portions compensate for each other so that substantially half the power of the original signal provided by the modulator 10 is transmitted onto the system. Furthermore, since the information content is arranged symmetrically around the carrier wavelength, any information that is lost from the upper sideband is contained in the vestige of the lower sideband and so, overall, information loss is minimised.

In use, the laser source 6 provides a continuous wave laser output to the modulator 10, which modulates the spectrum of the laser in accordance with data to be transmitted onto the 10 system. A wavelength spectrum, symmetrical about the central carrier frequency of the channel is then coupled to the optical filter 12. The optical filter 12 removes one sideband from the spectrum leaving a remaining sideband and a vestige of the removed sideband. The remaining sideband is transmitted onto the communications system. The power of the transmitted sideband (or a measure thereof) and the removed sidebands (or a measure thereof) are coupled to the feedback circuit which compares them and modulates the wavelength of the laser source in dependence on this.

As an alternative, instead of, or as well as, modulating the wavelength of the laser source and the effective position on the wavelength axis of FIG. 3 of the spectrum 22, the filtration element 12 can be controlled to vary the cut-off wavelength of the transmission profile ie the rise up edge of the transmission profile is controlled to coincide with the central wavelength of the spectrum. In both of these cases, the system is controlled to ensure that the transmitted power and reflected power remain substantially equal.

Figure 4:
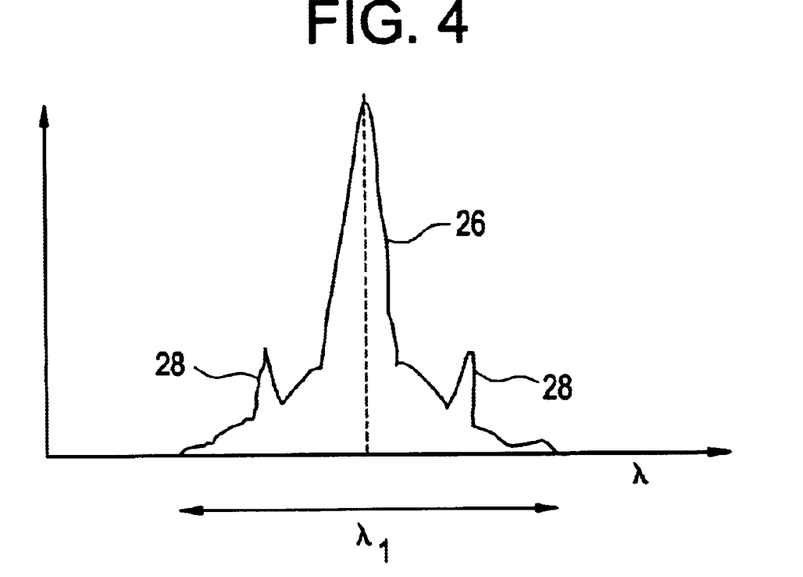
FIG. 4 shows an example of the optical transmission spectrum of an RZ optical signal used in a conventional transmission system.
Figure 5:
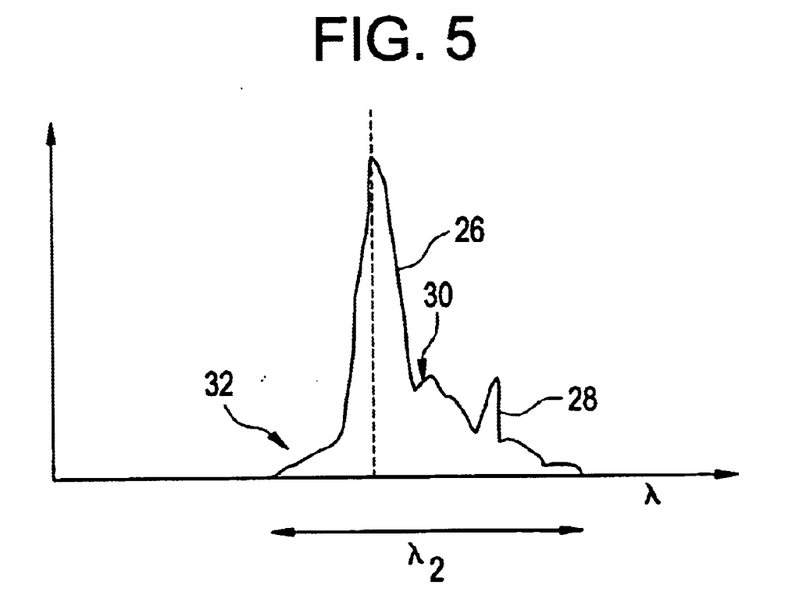
FIG. 5 shows an example of the optical transmission spectrum of an optical signal used in a transmission system of FIG. 2.

FIGS. 4 and 5 show examples of a resolved optical transmission spectrum of an RZ optical signal used in a conventional transmission system and in a transmission system according to the present invention. In FIG. 4, the central carrier 26 and two clock peaks 28 can be clearly seen. The spectrum 22 is filtered by the VSB filter described above so that the lower sideband of the spectrum 22 is removed, leaving the remaining upper sideband and only a vestige of the removed sideband. The bandwidth required for transmission of this filtered spectrum is reduced from $\lambda_1$ to $\lambda_2$. Slight erosion of the 'upper' sideband is clearly visible, as is the residual or vestige of the lower sideband (see FIG. 5), in both cases due to the gradient of the rising edge of the filter transmission profile of the optical filter 12. The reduction in bandwidth of the transmitted signal and of the corresponding channel enables additional channels to be fitted into existing system bandwidth thereby increasing the system transmission capacity without requiring significant upgrading of the system hardware.

Figure 6:
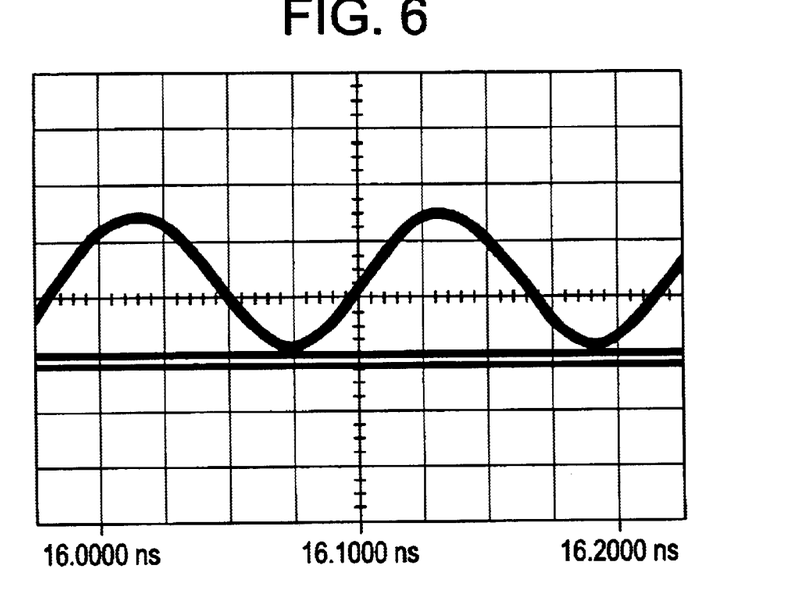
FIG. 6 shows an optical eye diagram for a resolved optical signal from a conventional optical transmission system.
Figure 7:
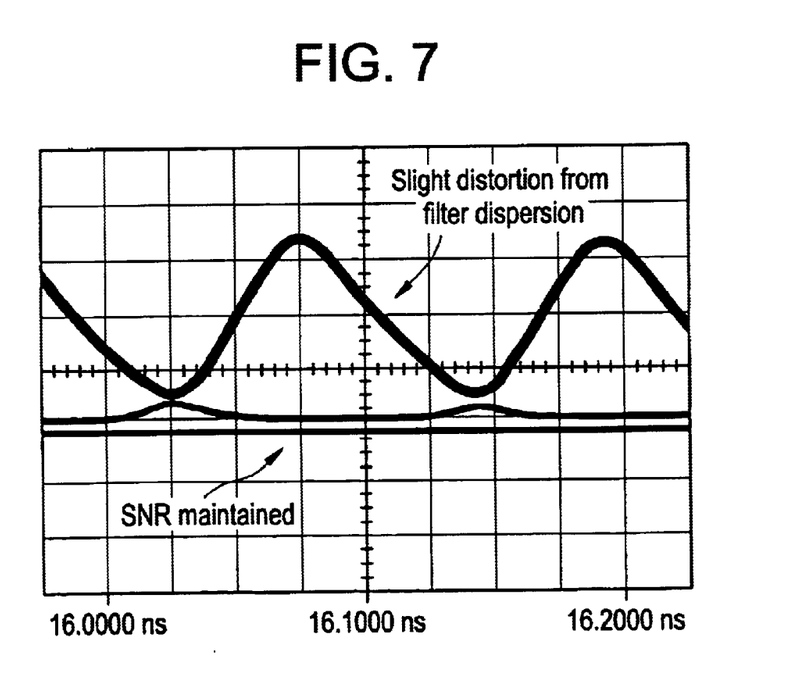
FIG. 7 shows an optical eye diagram for a resolved optical signal from an optical transmission system of FIG. 2.

As in all optical communications systems, when the transmitted signal is received at a remote endstation of the communications system, it must be resolved. FIGS. 6 and 7 show optical eye diagrams for a resolved optical signal from a conventional optical transmission system and from an optical transmission system according to the present invention, respectively. It is clear that although there is slight distortion of the resolved signal in FIG. 7 compared to that in FIG. 6, the signal to noise ratio is maintained meaning that all the information is still retrievable despite the fact that the bandwidth used to transmit it was substantially reduced. The distortion that is introduced into the resolved signal of FIG. 7 arises due to dispersion introduced by the particular optical filters used in the transmission system. A filter that is specifically designed for this purpose would have improved dispersion characteristics.

Figure 8:
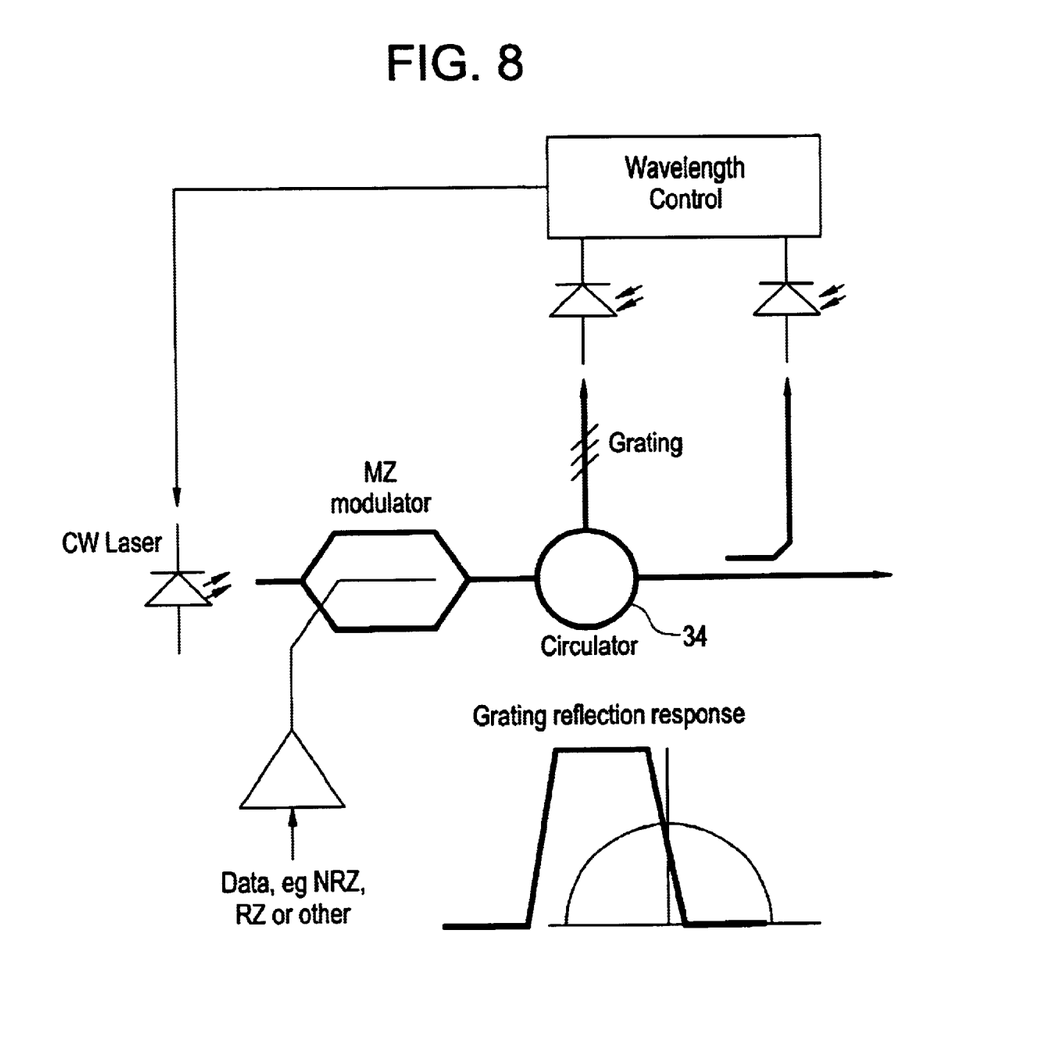
FIGS. 8 and 9 show further examples of optical transmission systems according to the present invention; and, FIG. 10 shows a simplified schematic of a communications system incorporating an optical transmission system according to the present invention.
Figure 9:
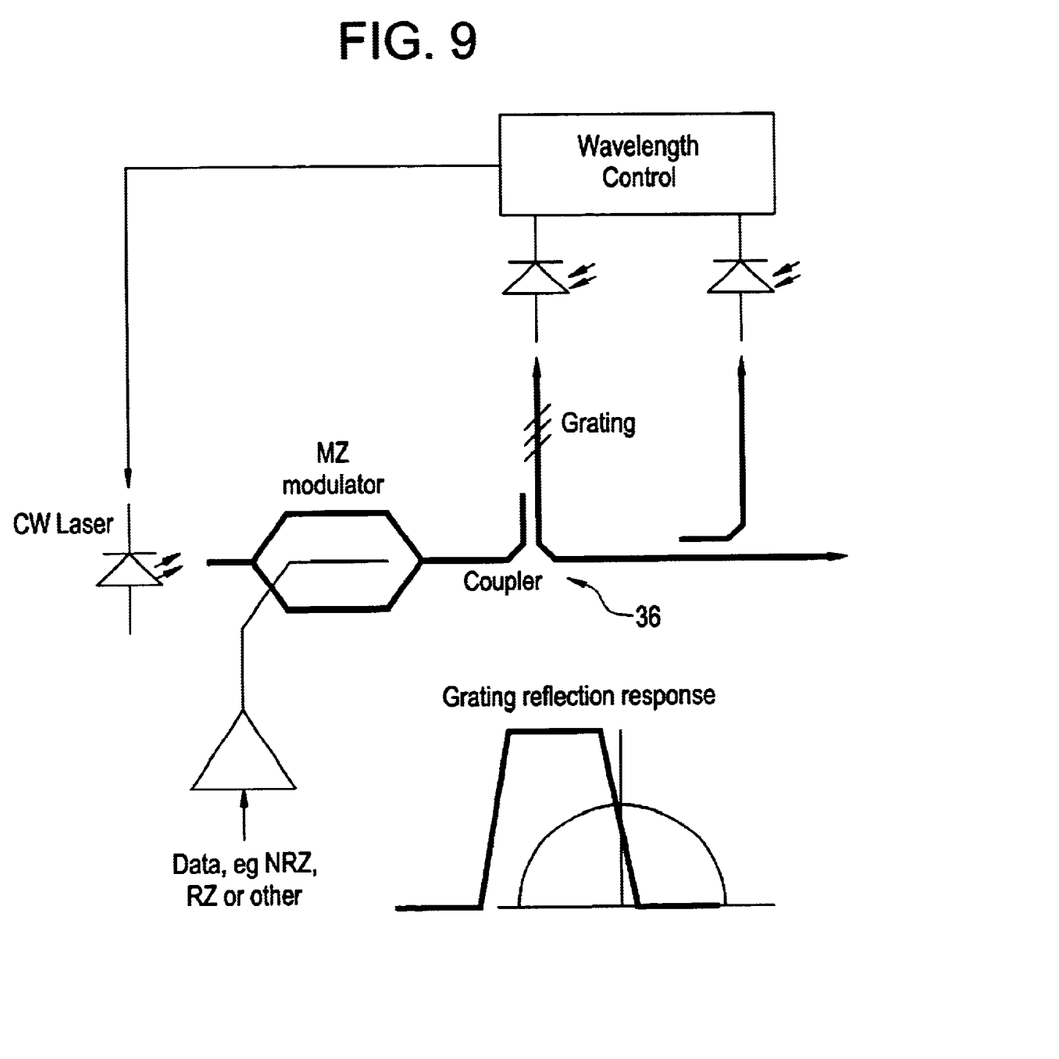

FIGS. 8 and 9 show further examples of optical transmission systems according to the present invention. In FIG. 8, the output from the modulator 10 is coupled to an optical circulator 34 and the optical filter is arranged in the branch of the feedback loop connecting the first pin diode 16 to the control unit 14. The operation of the transmission system is similar to that described with reference to FIG. 1 except the transmission profile of the grating is reversed so that the second half of the optical spectrum provided by the modulator 10 is transmitted as opposed to the first half. In FIG. 9, an optical coupler 36 is used in place of the circulator 34 and the optical filter is again provided in the feedback loop as shown.

Figure 10:
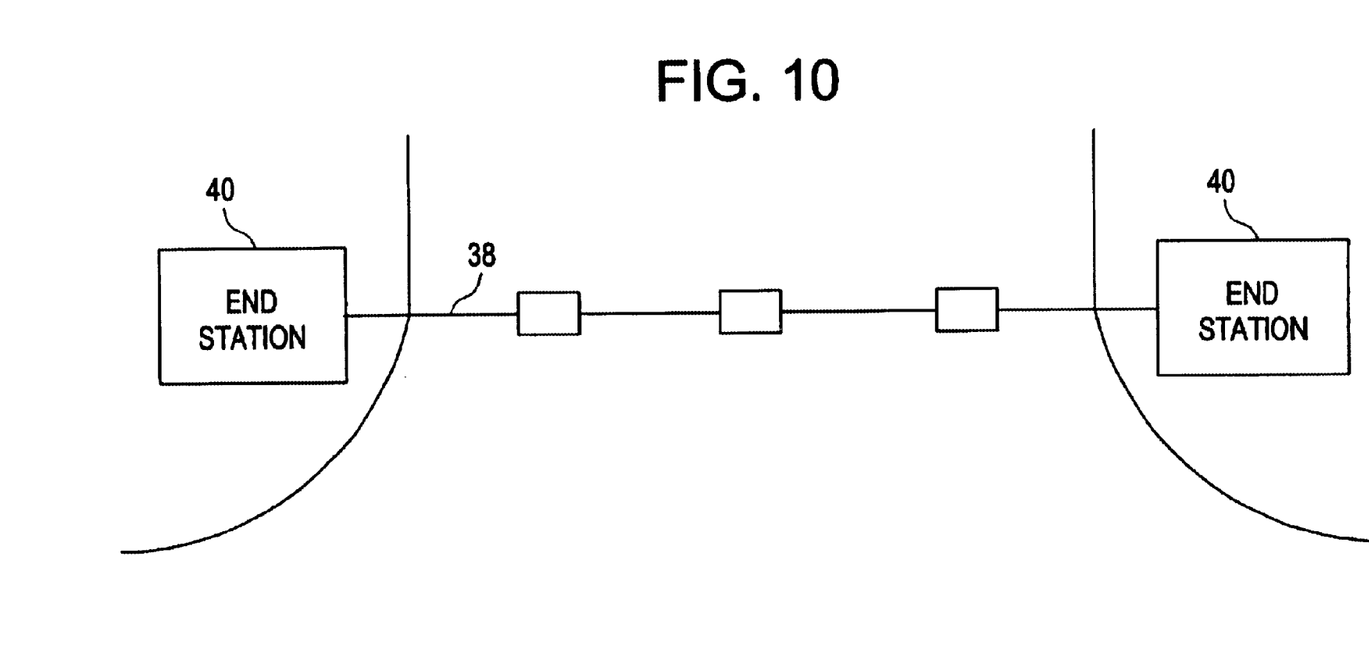

FIG. 10 shows an example of an optical communications system according to the present invention. In this case, the communications system is a submarine communications system although the invention is not limited to this. The system has a submarine cable 38 connected between two endstations 40. Each of the endstations 40 includes an optical transmission system to transmit optical signals onto the cable 38. At least one of the optical transmission systems is an optical transmission system according to the present invention.

What is claimed is:

1. An optical transmission system for an optical communications system, comprising:
   an optical source;
   an optical modulator for modulating an optical output of the optical source;
   an optical filter arranged to substantially remove one of the upper and lower sidebands of the modulated optical output of the optical source; and
   control means to control at least one of the optical source and the optical filter to ensure that substantially only half of the power of the modulated optical output of the optical source is transmitted, thereby reducing the bandwidth of the optical signals transmitted by the system.

2. An optical transmission system according to claim 1, wherein a vestige of either the upper or lower sideband is also transmitted.

3. An optical transmission system according to claim 1, in which the control means is arranged to move the wavelength spectrum of the modulated optical output of the optical source and a transmission profile of the optical filter relative to each other to control the power of the transmitted signal.

4. An optical transmission system according to claim 3, in which the control means comprises a feedback loop arranged to detect reflected light from the optical filter and transmitted light from the optical filter and to move the wavelength spectrum of the modulated optical output of the optical source and the transmission profile of the optical filter relative to each other to ensure the detected power of the transmitted light and the detected power of the reflected light remain substantially equal.

5. An optical transmission system according to claim 4, in which the feedback loop comprises a first branch having an optical sensor arranged to detect the intensity of the reflected light from the optical filter and a second branch having an optical sensor arranged to detect the intensity of the transmitted light from the optical filter.

6. An optical transmission system according to claim 5, further comprising a control unit arranged to receive outputs from optical sensors in the first and second branches of the feedback loop, respectively, and vary the wavelength of the laser source and/or the position of the rising edge of the transmission profile of the optical filter accordingly.

7. An optical transmission system according to claim 6, which the control unit is arranged to control the temperature of the optical fiber grating, thereby controlling the position of the rising edge of the transmission profile relative to the modulated optical output of the optical source.

8. An optical transmission system according to claim 6, further comprising an optical coupler arranged to couple the modulated optical output of the optical source from a transmission path in the transmission system to the optical filter positioned in the first branch of the feedback loop and couple reflected light from the optical filter back to the transmission path in the transmission system.

9. An optical transmission system according to claim 8 further comprising a second optical coupler arranged to couple light from the first optical coupler to the optical sensor positioned in the second branch of the feedback loop.

10. An optical transmission system according to according to claim 1, in which the optical source is a continuous wave laser source.

11. An optical transmission system according to according to claim 1, in which the optical modulator is a Mach Zehnder modulator.

12. An optical transmission system according to according to claim 1, in which the optical filter comprises an optical fiber grating having a notch transmission profile, wherein a carrier frequency of the modulated optical output is controlled to substantially coincide with the rising edge of the notch transmission profile, thereby ensuring that substantially half of the modulated optical output of the optical source is transmitted and half is reflected.

13. An optical transmission system according to claim 12, which the control means is arranged to control the temperature of the optical fiber grating, thereby controlling the position of the rising edge of the transmission profile relative to the modulated optical output of the optical source.

14. A line terminal endstation for a wavelength division multiplexed communications system, comprising a number of optical transmission systems for generating a number of individual channels, in which at least one of the optical transmission systems is an optical transmission system according to according to claim 1.

15. An optical communications system comprising at least one line terminal endstation according to claim 14.

16. An optical communications system according to claim 15, in which the communications system is a submarine communications system.

17. An optical communications system according to claim 15, in which the communications system is a terrestrial communications system.

18. An optical transmission system for an optical communications system, comprising:

an optical source;

an optical modulator for modulating an optical output of the optical source;

an optical filter arranged to provide an optical vestigial sideband signal of the modulated optical output of the optical source; and control means to control at least one of the optical source and the optical filter to ensure that substantially only half of the power of the modulated optical output of the optical source is transmitted.

19. An optical transmission system for an optical communications system, comprising:

an optical source;

an optical modulator for modulating an optical output of the optical source;

an optical filter arranged to substantially remove one of the upper and lower sidebands of the modulated optical output of the optical source; and a controller that controls at least one of the optical source and the optical filter to ensure that substantially only half of the power of the modulated optical output of the optical source is transmitted.

20. An optical transmission system according to claim 19, wherein a vestige of either the upper or lower sideband is also transmitted.

* * * * *